United States Patent [19]

Nachtman et al.

[11] 4,119,547

[45] Oct. 10, 1978

[54] HIGH TEMPERATURE LUBRICANT COMPOSITION

[75] Inventors: Elliot S. Nachtman, Evanston; Ronald G. Hitchcock, Chicago, both of Ill.

[73] Assignee: Tower Oil & Technology Co., Chicago, Ill.

[21] Appl. No.: 704,296

[22] Filed: Jul. 12, 1976

[51] Int. Cl.² .............................................. C10M 1/10
[52] U.S. Cl. ...................................... 252/25; 252/29; 252/49.5
[58] Field of Search ........................... 252/25, 29, 49.5

[56] References Cited

U.S. PATENT DOCUMENTS

| | | | |
|---|---|---|---|
| 2,932,576 | 4/1960 | Vierk et al. | 252/29 X |
| 2,965,574 | 12/1960 | Tierney et al. | 252/49.5 X |
| 3,041,281 | 6/1962 | Winsor et al. | 252/49.5 X |
| 3,052,629 | 9/1962 | Morrow | 252/29 |
| 3,213,024 | 10/1965 | Blake et al. | 252/49.5 X |
| 3,495,962 | 2/1970 | Norton et al. | 252/29 X |
| 3,791,975 | 2/1974 | Halkias | 252/49.5 |
| 3,806,453 | 4/1974 | McDole | 252/29 X |
| 3,835,052 | 9/1974 | McDole et al. | 252/49.5 |
| 3,931,020 | 1/1976 | Burgess et al. | 252/25 |
| 3,969,233 | 7/1976 | Lucas | 252/49.5 X |

*Primary Examiner*—Helen M. S. Sneed
*Attorney, Agent, or Firm*—McDougall, Hersh & Scott

[57] ABSTRACT

A high temperature lubricant composition formulated of a discontinuous aqueous phase in a continuous phase of lubricant.

9 Claims, No Drawings

HIGH TEMPERATURE LUBRICANT COMPOSITION

This invention relates to high temperature lubricants and more particularly to a lubricant composition of the type described in which water is present as a major component.

A desirable high temperature lubricant is characterized by low fire hazard and minimum generation of smoke and mist, while being able to cool the tool and provide a barrier film between the work piece and tool under the high temperature conditions existing during processing of the work. The high temperatures for which such lubricants are designed are represented by those inherent in manufacturing processes, such as the temperatures produced by heating steel for hot forging, the temperature produced during the fabrication of glass bottles from molten glass, and the temperature induced by working operations such as high speed machining of difficult to machine materials.

In general, such high temperature lubricants have heretofore been provided in the form of an aqueous emulsion in which the water represented the continuous phase and a lubricant the discontinuous phase. Difficulties have been experienced with the use of lubricant compositions of the type described in that an excessive amount of smoke and mist is generated when used in such high temperature manufacturing processes and the protection between the work piece and tool is insufficient, especially in glass working operations. It may be that the hydrophilic surfaces or other surfaces are initially engaged by the continuous water phase thereby to block suitable wet-out of the working surfaces by the lubricating component and/or the steam given off by evaporation upon engagement with the hot surfaces may operate to carry off the lubricant as fine particles to form a smoke or mist and otherwise generate hazardous conditions.

It is an object of this invention to deviate from conventional practice in the production of a high temperature lubricating composition and to make available a number of unique operating characteristics, such as reduced smoke or mist generation during use and less fire hazard, while providing the desired barrier film between the work and tool.

It has been discovered that the characteristics of the type described can be achieved by reversal of the status of the components wherein the lubricating component is embodied as a liquid and/or solid in the continuous phase, while the aqueous phase is embodied as the dispersed phase. Thus the hot surfaces to be cooled and lubricated are first engaged by the continuous phase containing the lubricating component or components to wet out the surfaces before an aqueous hydrophilic and lubricant repellent phase can form on the hot surfaces of the tool or work. This is especially effective in the processing of molten glass which is a highly hydrophilic material but it is equally effective as a high temperature lubricant in the processing of metal and other materials at high temperature.

The desired reversal of phases is achieved by the use of an oil-soluble surfactant or combination of surfactants where final HLB number is low, to stabilize the composition. Representative of such oil-soluble surfactants are lypophilic tertiary amides in which the lypophilic group is a long chain alkyl such as a $C_8$ to $C_{18}$ alkyl, as represented by octyl, decyl to octyl, and the like, a polycyclic group such as cholesterol, aryl alkyl and derivatives thereof in which the alkyl is from 1 to 10 carbon atoms and the aryl is phenyl, naphthyl, and the like. Surfactants having a final HLB number below 7 and preferably below 5 are suitable for use.

A lypophilic tertiary amide of the type described is marketed by the Lubrizol Corporation under the trade name Lubrizol 5162.

The continuous lubricant phase may consist, for example, of a low molecular weight polymer formed of such polymers as isobutene, high molecular weight alcohols or polyols which are immiscible in water, as well as petroleum based oils of varying viscosity, such as naphthenic based oils. The continuous lubricant phase can be formulated to contain a solid which provides high temperature lubrication under the conditions described without raising hazards or the generation of smoke or mist. Representative of such solid lubricants are graphite, molybdenum disulfide, mica, boron nitride and potassium iodide.

The continuous phase consists of a carrier such as isobutene employed in an amount up to 97% by weight, but it is preferred to limit this component to an amount within the range of 53–93% by weight. A surfactant or blend of surfactants such as a lypophilic tertiary amide may be employed in an amount up to 20% by weight such as in an amount within the range of 2–10% or 3–6% by weight of the continuous phase. Extreme pressure agents such as ditertiary nonyl polysulfide may be employed in amounts up to 25% by weight, but with a preferred range of 1–20% by weight. Solid lubricants such as $MoS_2$ may be employed in an amount up to 50% but it is preferred to limit this component to an amount within the range of 10–30% by weight.

The discontinuous aqueous phase makes up substantially the remainder of the lubricating composition except for the surfactant. The aqueous phase may consist of water alone or it may consist of water with additional water-soluble components dissolved therein, such as low molecular weight alcohols or glycols, amines, inorganic salts, etc. Such water-soluble additive to the aqueous discontinuous phase may represent up to 25% but it is preferred to limit the amount to within the range of 1–10% by weight of the aqueous phase.

The following examples are given by way of illustration and not by way of limitation of various high temperature lubricating compositions embodying the features of this invention and formulated for specific applications as follows:

EXAMPLE 1

Glass mold lubricating composition:
17.5% by weight isobutene polymer, having an average molecular weight of 340 (Poly Vis. OSH)
20.0% by weight isobutene polymer, having an average molecular weight of 1350 (Lubrizol 3156)
10.0% by weight naphthenic base oil (100 SSU at 100° F.)
7.5% by weight graphite (1–5 microns, ashless)
40.0% by weight water
5.0% by weight alkanol surfactant (Lubrizol 5162)

EXAMPLE 2

Glass ring lubricating composition:
47.5% by weight isobutene polymer, having an average molecular weight of 340
5.0% by weight alkanol amide surfactant (Lubrizol 5162)

7.5% by weight graphite
40.0% by weight water

EXAMPLE 3

25.0% by weight isobutene polymer, having an average molecular weight of 340 (Poly Vis OSH)
15.0% by weight isobutene polymer, having an average molecular weight of 1350 (Lubrizol 3156)
2.0% by weight lypophilic surfactant, polyol trioleate (I.C.I. Atsurf 2802)
3.0% by weight hypophilic surfactant, ethoxylated polyol trioleate (I.C.I. Atsurf 2802)
10.0% by weight graphite
45.0% by weight $H_2O$

EXAMPLE 4

53.0% by weight naphtenic oil (1400 SSU at 100° F.)
5.0% by weight lypophilic surfactant polyol trioleate (Atsurf 2802 I.C.I.)
4.0% by weight lypophilic surfactant, ethoxylated polyol stearate (I.C.I. Atsurf 2823)
10.0% by weight $H_2O$
20.0% by weight naphthenic oil (100 SSU at 100° F.)
8.0% by weight $MoS_2$ (molybdenum disulfide)

EXAMPLE 5

Metal cutting lubricating composition:
35.0% by weight naphthenic oil (37 SSU at 100° F.)
5.0% by weight surfactant (alkanol amide surfactant — Lubrizol 5162)
2.0% by weight ethylene glycol
35.0% by weight water
9.2% by weight naphthenic oil (100 SSU at 100° F.)
8.5% by weight sulfurized sperm oil substitute
5.75% by weight chlorinated paraffin (42% chlorine — 5000 SSU at 210° F.)

EXAMPLE 6

High temperature lubricating composition:
26.5% by weight isobutene polymer, having an average molecular weight of 340
19.0% by weight isobutene polymer, having an average molecular weight of 1350
5.0% by weight lubricant (Lubrizol 5162)
2.0% by weight ditertiary nonyl polysulfide
40.0% by weight water
7.5% by weight graphite The name "Lubrizol," as used in the examples, refers to the Lubrizol Corporation of Cleveland, Ohio.

In Examples 1–4, the solid lubricant and the surfactants are first added to the carrier along with any other lubricant component and then the water is added with mixing whereby the water or aqueous phase is dispersed as the discontinuous phase in a continuous phase of the lubricant component.

In Example 5, the ethylene glycol and water are first combined. The remainder of the components are combined with the naphthenic oil and the former is then introduced with mixing to form the discontinuous phase in the continuous phase of the lubricant material.

In Example 6, all of the components with the exception of the water are first combined and then the water is introduced with mixing to form the discontinuous phase in the continuous phase of the lubricant components.

It will be understood that changes may be made in the details of formulation and operation, without departing from the spirit of the invention, especially as defined in the following claims.

We claim:

1. A high temperature lubricating composition consisting essentially of (a) a high temperature liquid lubricant (b) a surfactant having an HLB number below 7 and which is soluble in the liquid lubricant, (c) a finely divided, solid, high temperature lubricant selected from the group consisting of graphite, molybdenum disulfide, mica, boron nitride and potassium iodide, (d) water, (e) a water soluble component selected from the group consisting of a low molecular weight alcohol, glycol, amine, and inorganic salt, elements (a), (b), and (c) being present in a continuous phase and elements (d) and (e) being present as a discontinuous phase dispersed in the continuous phase, with the continuous phase making up 55 to 90% by weight of the composition and the discontinuous phase making up the remainder and in which the surfactant is present in an amount within the range of up to 20% by weight of the continuous phase, the finely divided high temperature solid lubricant is present in an amount within the range of 10–30% by weight of the continuous phase and the water soluble component is present in an amount up to 25% by weight of the discontinuous phase.

2. A composition as claimed in claim 1 in which the surfactant is a lypophilic tertiary alkanol amide.

3. A composition as claimed in claim 2 in which the surfactant is present in an amount within the range of 2–10% by weight of the continuous phase.

4. A composition as claimed in claim 1 in which the surfactant is present in an amount within the range of 3–6% by weight.

5. A composition as claimed in claim 1 in which the liquid lubricant component is selected from the group consisting of a low molecular weight isobutene polymer, a high molecular weight alcohol or polyol, and a petroleum based oleaginous material.

6. A composition as claimed in claim 1 in which the water-soluble component is present in an amount within the range of 5–15% by weight of the discontinuous phase.

7. A composition as claimed in claim 1 in which the final HLB number of the surfactant is below 5.

8. A composition as claimed in claim 1 in which the water-soluble component is present in an amount within the range of 1–10% by weight of the discontinuous phase.

9. A composition as claimed in claim 5, in which the low molecular weight polymer is an isobutene polymer.

* * * * *